(12) United States Patent  
Luther (10) Patent No.: US 8,651,341 B1  
(45) Date of Patent: Feb. 18, 2014

(54) WHEELED DIVOT HOLE FILLER FOR GOLF COURSES

(76) Inventor: Rick Luther, Vacaville, CA (US)

( * ) Notice: Subject to any disclaimer, the term of this patent is extended or adjusted under 35 U.S.C. 154(b) by 70 days.

(21) Appl. No.: 13/316,814

(22) Filed: Dec. 12, 2011

Related U.S. Application Data (60) Provisional application No. 61/422,900, filed on Dec. 14, 2010.

(51) Int. Cl.
| | |
|---|---|
| *A01C 15/16* | (2006.01) |
| *B65D 47/00* | (2006.01) |
| *B67D 7/84* | (2010.01) |
| *A01C 7/02* | (2006.01) |
| *A01C 5/02* | (2006.01) |

(52) U.S. Cl.
USPC ........... 222/609; 222/544; 222/160; 239/652; 111/95

(58) Field of Classification Search
USPC ................ 222/608, 544, 160, 609, 620, 310; 172/354, 329, 351, 371; 239/650, 652; 111/130, 92, 95
See application file for complete search history.

(56) References Cited

U.S. PATENT DOCUMENTS

| | | | |
|---|---|---|---|
| 4,090,457 A * | 5/1978 | Roberts | 111/82 |
| 5,465,869 A | 11/1995 | Schleicher et al. | |
| 6,450,268 B1 | 9/2002 | Taylor | |
| 6,672,400 B1 * | 1/2004 | Taylor | 172/354 |
| 7,216,785 B1 | 5/2007 | Meyer et al. | |
| 2005/0241553 A1 | 11/2005 | Dika | |
| 2007/0284855 A1 | 12/2007 | Lin | |

* cited by examiner

*Primary Examiner* — Kevin P Shaver  
*Assistant Examiner* — Stephanie E Williams  
(74) *Attorney, Agent, or Firm* — Traverse Legal, PLC (57) ABSTRACT

A divot repair cart for filling divot holes with a repair mixture. The cart has a self-supporting wheeled frame, a push handle for use at a standing height, a repair mix reservoir at a first height above the ground, and a rear-facing dispensing spout having a divot alignment position adjacent the ground in which the spout is visible from the push handle for aligning it with a divot hole. Repair mix is dispensed by tilting the cart. The spout may be movable relative to the cart, and further operable with a remote control such as a cable, to move the spout from the divot alignment position to a raised transport position.

9 Claims, 7 Drawing Sheets

WHEELED DIVOT HOLE FILLER FOR GOLF COURSES

RELATED APPLICATIONS/PRIORITY BENEFIT CLAIM

This application claims the benefit of U.S. Provisional Application No. 61/422,900 filed Dec. 14, 2010 by the same inventor (Luther), the entirety of which provisional application is incorporated herein by reference.

FIELD

The subject matter of the present application is in the field of equipment for filling golf course divot holes with a repairing mixture of seed/sand.

BACKGROUND

Most good golf swings produce a divot in the fairway. Golf swings can also produce divots on the tee and off the fairway. Repairing divots is the customary duty of the golfer who makes them, but golfers often cannot or do not replace their divots or fill their divot holes.

Golf courses employ people to fill unrepaired divot holes. Typically, divot holes are refilled one at a time, by hand, by an individual carrying a heavy bucket and a scoop, bending down to fill each hole. This is time-consuming, strenuous, and requires that the worker walk back and forth from a golf cart to replenish the bucket's supply of repair mix. It also requires that the worker frequently re-position the golf cart to locations estimated to be the most efficient for working different areas in need of repair.

BRIEF SUMMARY

I have invented a wheeled cart designed to transport and dispense a divot repair mixture to fill divot holes on a golf course. The cart streamlines the method of filling (and optionally smoothing) each individual divot hole. The cart affords users the ability to fill dozens of divot holes without refilling the mixture, carrying a bucket, or bending over. The cart saves time and energy and offers a more efficient method for filling golf course divot holes.

In basic form, the cart has a self-supporting wheeled frame with a manual push handle at standing height. The cart includes a repair mix reservoir at a first height above the ground, and a rear-facing (facing the push handle) dispensing spout visible from the handle and having a divot alignment position at a second lower height adjacent the ground. A person pushing the cart can accordingly see and precisely align the spout over a divot hole, without bending down, before dispensing the repair mixture. The dispensing spout communicates with the reservoir via feed tube, and from the divot alignment position the cart is operable to cause the repair mixture to flow from the reservoir by gravity through the tube to the spout and into a divot hole.

In the preferred form the spout is fixed relative to the cart in the divot alignment position, and the cart is tilted rearwardly to place the spout in a dispensing position in which the repair mixture pours from the spout into a divot hole by gravity. Tilting the cart back to the upright (divot alignment) position stops the flow of repair mixture. The spout may be provided with a shutoff valve that can be operated to start and stop flow in addition to, or instead of, tilting the cart.

In a further form the spout is movable upwardly relative to the cart from the divot alignment to a transport position, with a remote control operable from the push handle to move the spout between the divot alignment and transport positions without tilting the cart. In a currently preferred form the remote control is a push/pull cable.

These and other features and advantages of the invention will become apparent from the detailed description below, in light of the accompanying drawings.

DETAILED DESCRIPTION

Referring first to FIGS. 1 through 6, a divot repair cart 10 is shown in exemplary form in order to teach how to make and use the claimed invention. Cart 10 includes a self-supporting wheeled frame 12 with three wheels 14, 16, and 18. By "self-supporting" is meant that the cart stays upright when not being held or pushed by a worker. Although three wheels are preferred, alternate rolling frame arrangements would be possible, including but not limited to carts with four or more wheels, or carts with one or two wheels and one or two non-wheeled supports. While the wheels are illustrated as fixed axis, one or more wheels may be mounted to swivel.

Figure 1:
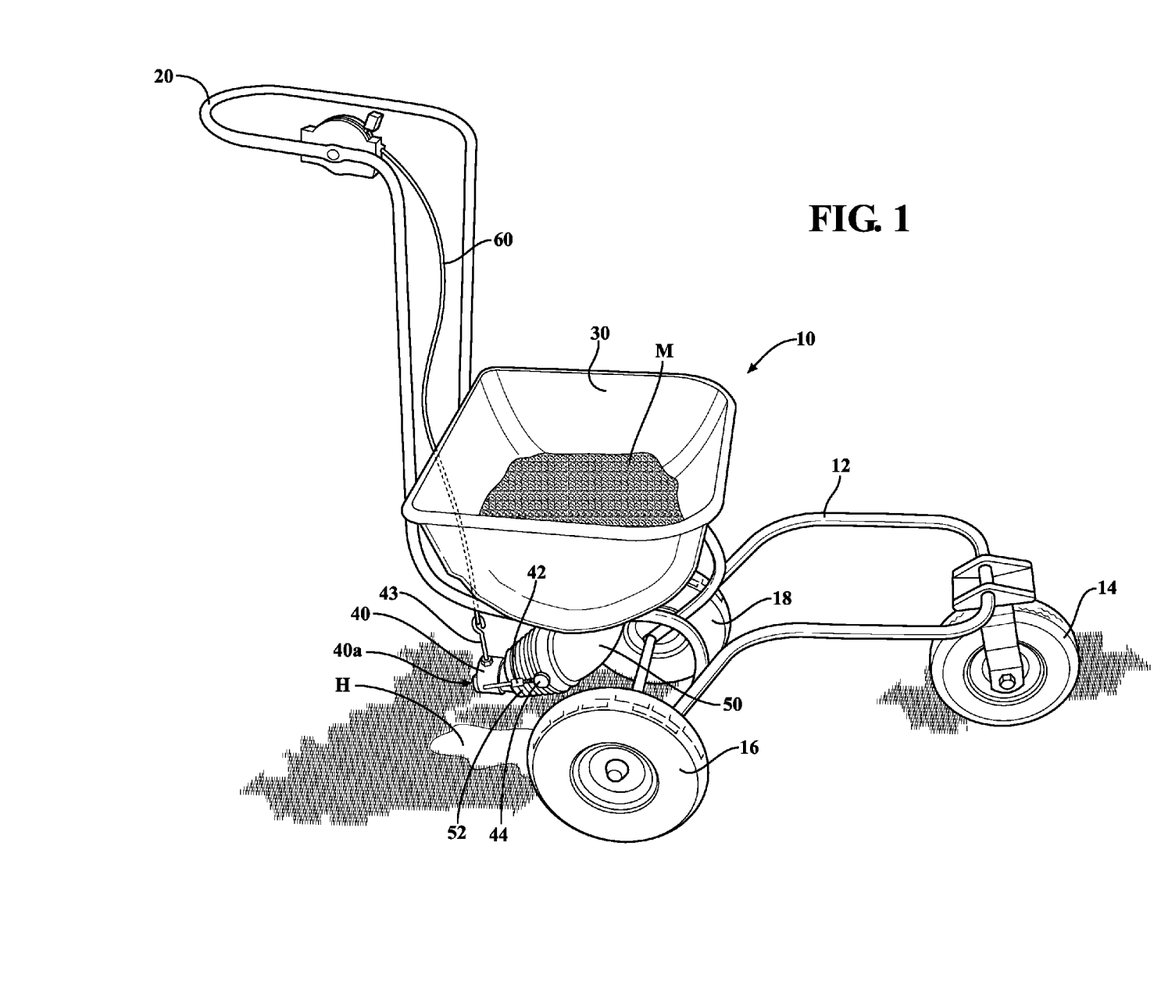
FIG. 1 is a side perspective view of a divot repair cart according to the invention.

Cart 10 further includes a push handle 20 on a rear side of the cart, "rear" being used as a term of convenience to define the handle side of the cart. Push handle 20 is located at a convenient height for a typical worker to grasp it with the hands and push or otherwise manipulate the cart while standing, and thus can be described as being at "standing height". Standing height may vary depending on the height of the worker using the cart, and it is possible to make handle 20 height-adjustable to accommodate workers of different height on the same cart. While handle 20 is described as a push handle, "push" is used as a term of convenience, and handle 20 can also be used to pull cart 10.

Cart 10 also includes a repair mix reservoir 30 supported by wheeled frame 12, at a first height high enough above the ground to permit a flowable dry repair mix M to flow by gravity from an opening 32 (FIGS. 3 and 4) at the bottom of reservoir 30 to ground level. Repair mix M will typically be a sand/seed mixture, although other flowable divot repair mixtures will be known to those skilled in the art of golf course repair.

Cart 10 further includes a rear-facing dispensing spout 40 in communication with reservoir 30, for example connected to the reservoir with a feed tube 50 communicating with reservoir bottom opening 32. Dispensing spout 40 extends rearwardly from reservoir 12 toward handle 20, and is normally in a divot alignment position shown in FIG. 1, at a second height below reservoir 30 adjacent the ground. In the illustrated example, dispensing spout 40 normally remains in the substantially horizontal divot alignment position (adjacent and approximately parallel to the ground) except when tilted to a dispensing position even closer to the ground.

However, it is possible, as shown and described in my above-mentioned provisional patent application, and as further described below, to have dispensing spout 40 movable relative to the cart to a raised storage position when the cart is being transported or stored. "Substantially horizontal" in the divot alignment position may include some small elevation above horizontal, enough to prevent repair mix from flowing out of the spout when the cart is substantially horizontal, i.e. on substantially level ground and not tilted rearwardly for dispensing.

The location of spout 40 in the rear-facing divot alignment position allows a standing person who is pushing or manipulating cart 10 by handle 20 to see the spout, and further to see the ground adjacent the spout, so that spout 40 can be aligned precisely with a divot hole H. Alignment will typically be performed by placing the opening 40a of the spout at or over a rear end of a divot hole, although variations in the initial placement of the spout relative to the hole are possible and will depend on the preferences and experience of the user.

Figure 2:
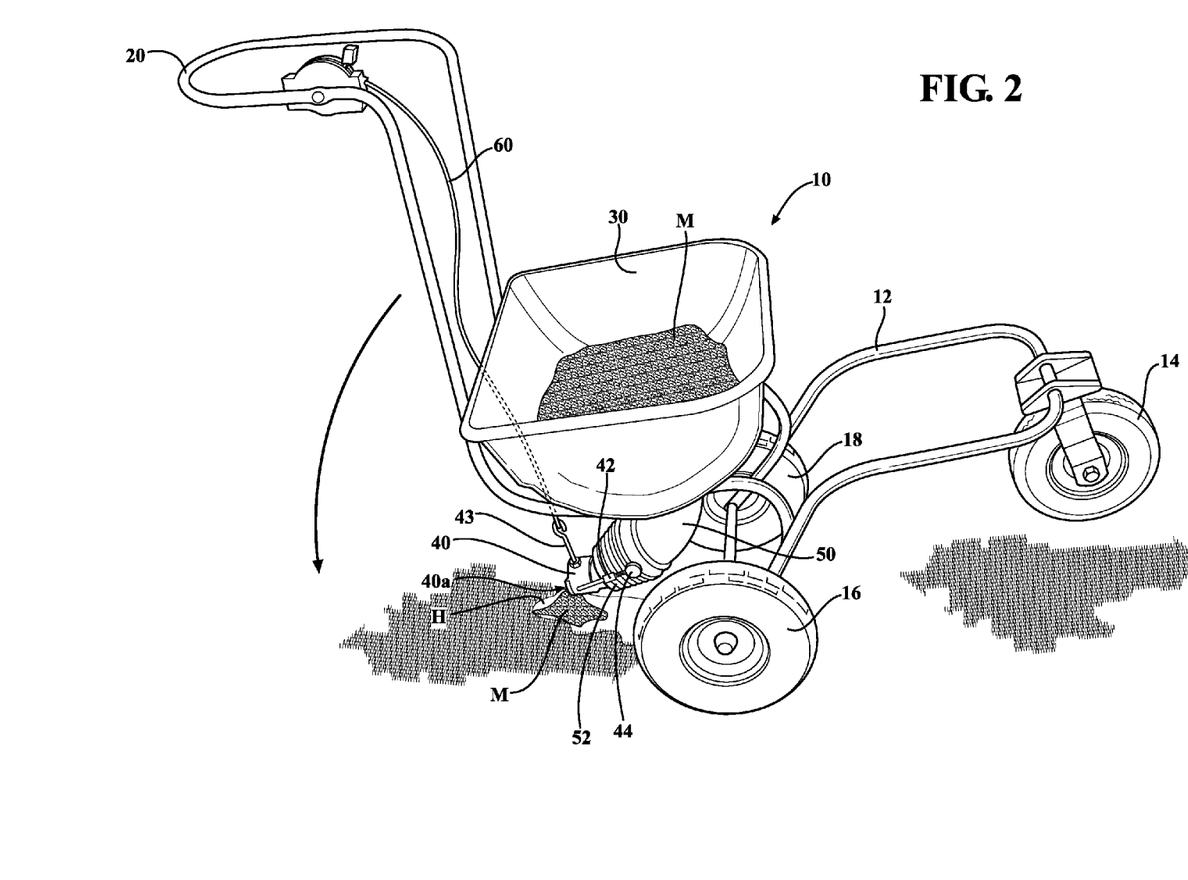
FIG. 2 is a side perspective view of the cart of FIG. 1, tilted to a dispensing position.
Figure 3:
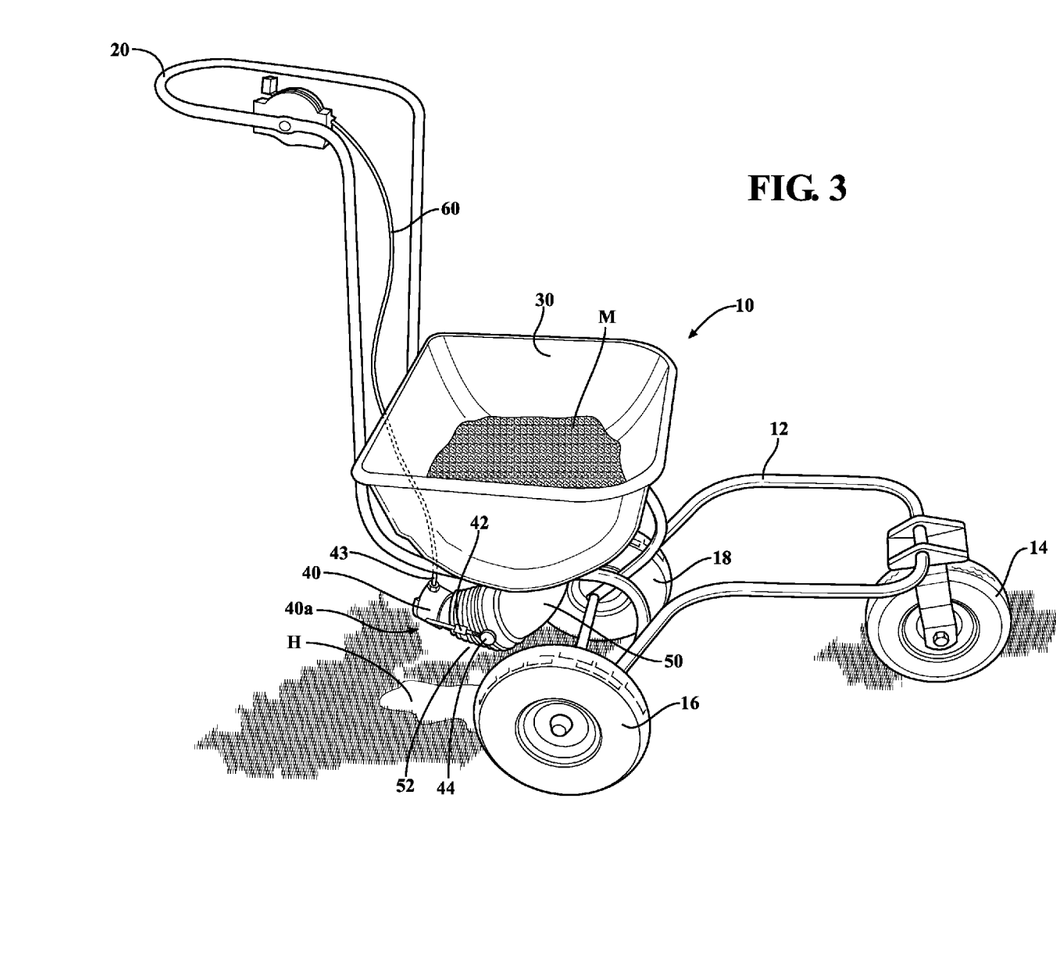
FIG. 3 is a side perspective view of the cart of FIG. 1, with the spout raised to a storage position.
Figure 4:
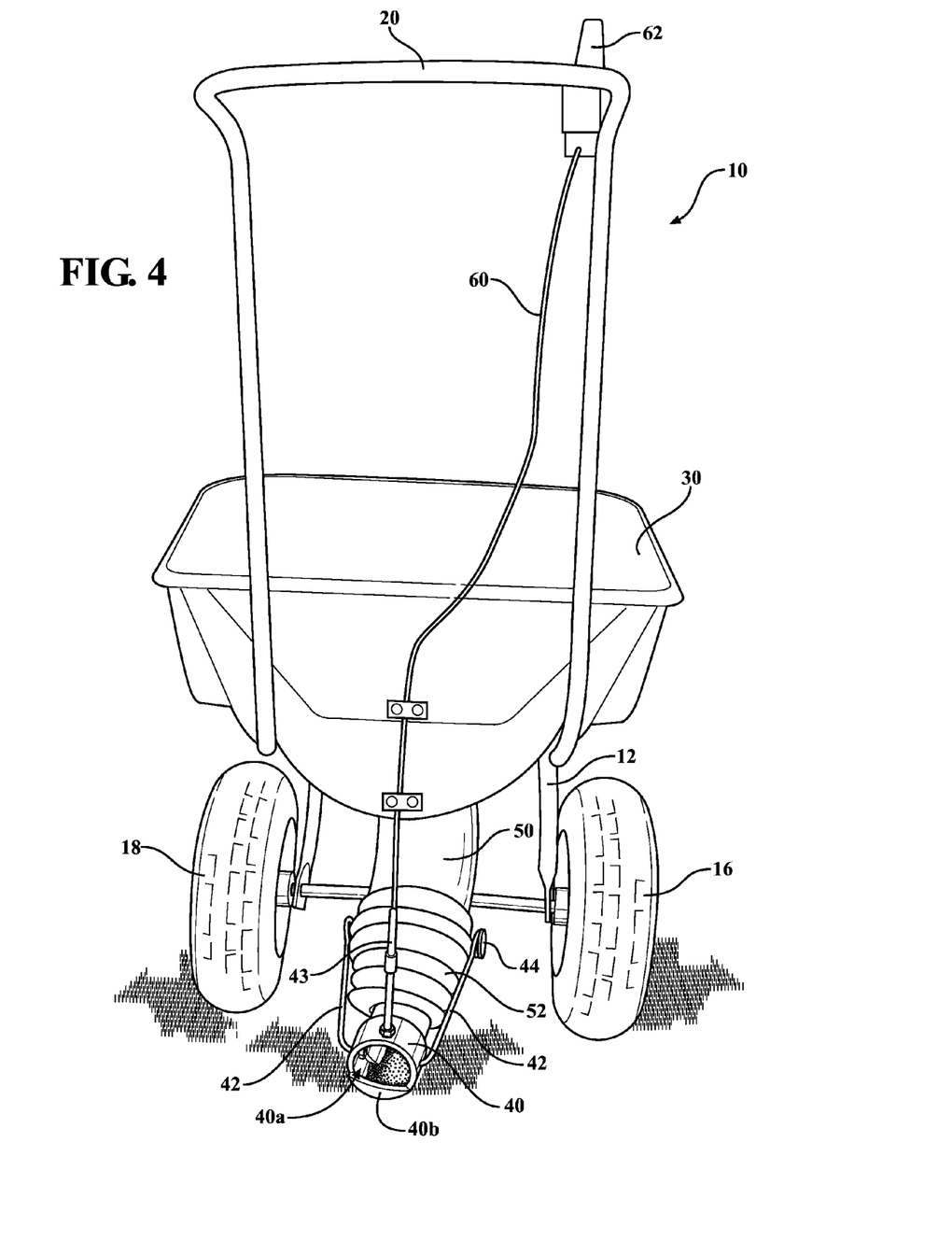
FIG. 4 is a rear perspective view of the cart of FIG. 1, with the spout in a divot alignment position.
Figure 5:
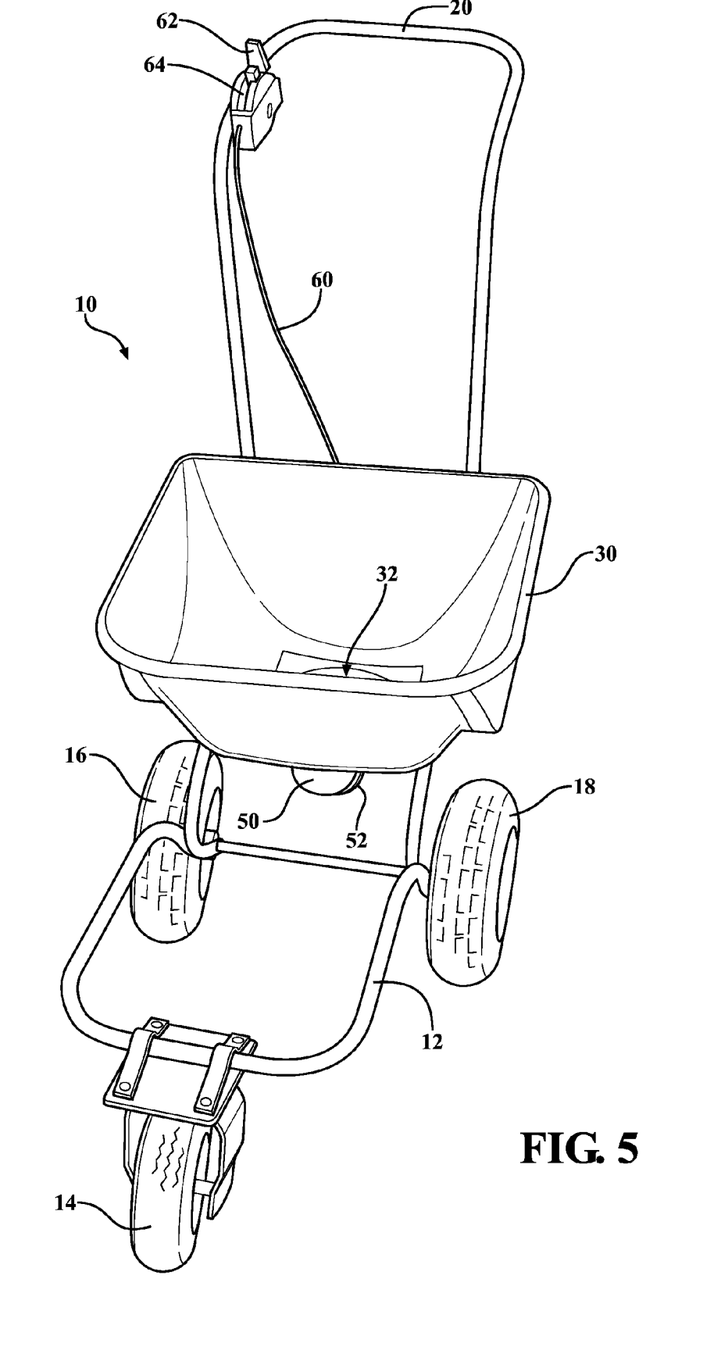
FIG. 5 is a front perspective view of the cart of FIG. 1.
Figure 6:
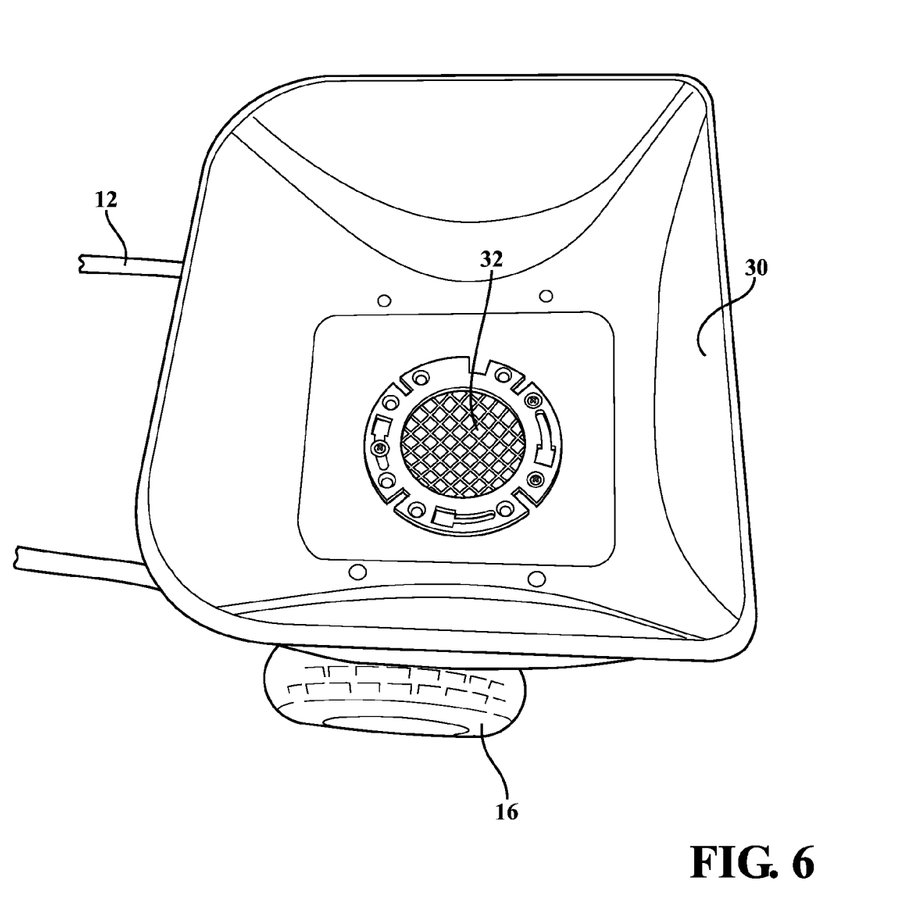
FIG. 6 is a top perspective view of the cart of FIG. 1.
Figure 7:
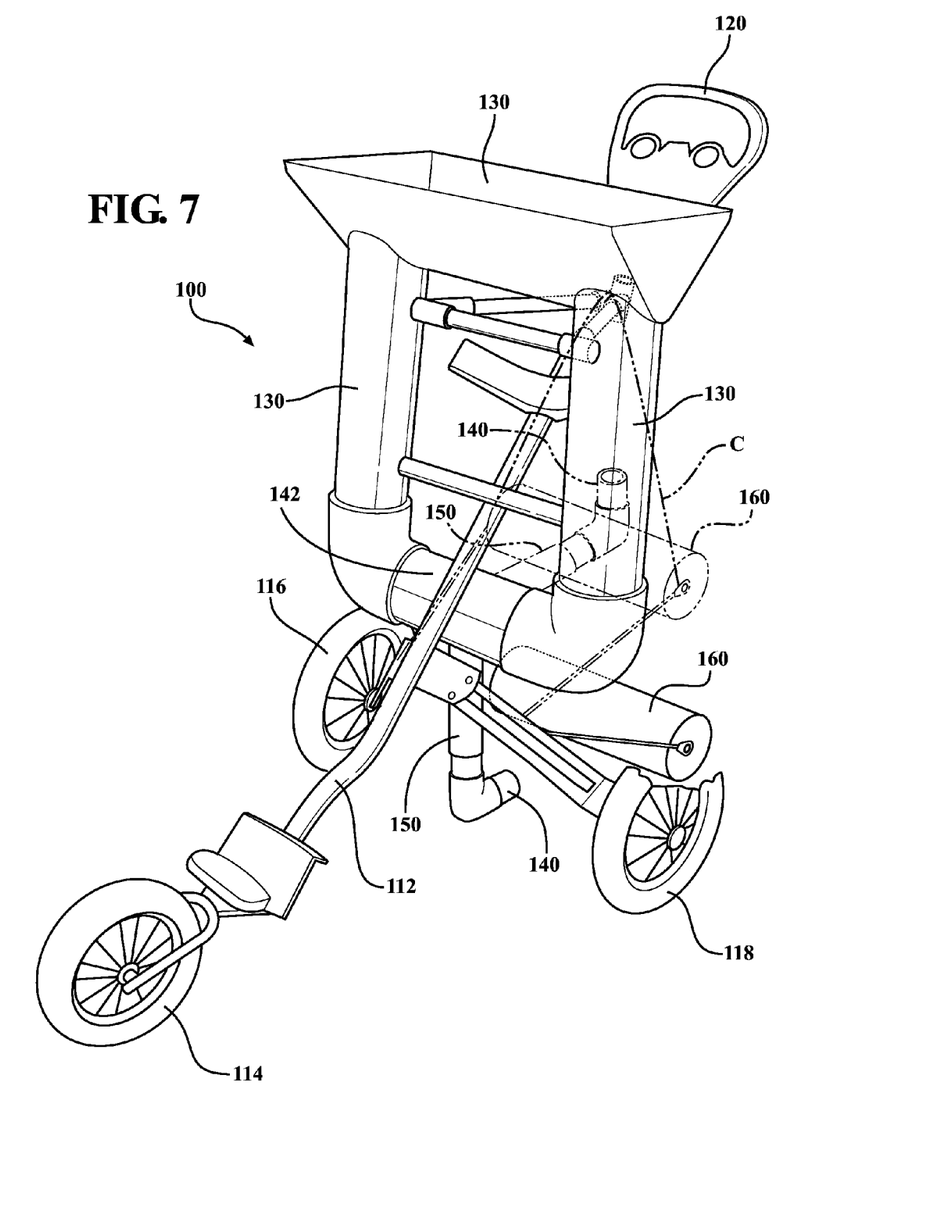
FIG. 7 is a perspective view of an alternate embodiment of a divot repair cart according to the invention.

Spout 40 in FIGS. 1 through 6 is movable relative to the cart, from the divot alignment position of FIGS. 1 and 2 to a raised transport position shown in FIG. 3 (also in phantom in FIG. 4). Movement of spout 40 is achieved in the illustrated example by flexibly mounting spout 40 on the lower end of feed tube 50, via a flexible connector such as a rubber boot 52. In the illustrated example, feed tube 50 and spout 40 are essentially rigid plastic or metal materials, while boot 52 is made from a softer, more flexible rubber or plastic. Other types of flexible connection between spout 40 and feed tube 50 are possible, including but not limited to rotating joint-type connections (as shown in FIG. 7) and durable fabric tubes.

More specifically, in the illustrated example of FIGS. 1 through 6 and best shown in FIG. 4, spout 40 is rotatably secured by two eyebolts 42 to a cross-pin 44 secured to and extending through the lower end of feed tube 50. Spout 40 is additionally connected by a third eye-bolt 43 to a remote control cable or rod 60 for up and down pivoting movement relative to the cart. Flexible boot 52 holds an inner end of spout 40 in sealing relationship, for example with a friction or adhesive or mechanical connection, and allows the spout 40 to pivot up and down relative to the end of the feed tube.

In the "down" position shown in FIG. 1, spout 40 is in the divot alignment position and, although the spout opening 40a is uncovered, repair mix M cannot readily flow out of the substantially horizontal spout. Spout opening 40a may be provided with a lip or other partial obstruction 40b to help keep the repair mix M in the spout when the spout is in the divot alignment position. Spout 40 is easily viewed from the standpoint of a user operating the cart from handle 20, and can be aligned precisely with a divot hole H.

With the spout 40 in the divot alignment position, cart 10 can be tilted rearwardly on rear wheels 16 and 18 (raising front wheel 14 off the ground) to put spout 40 in the dispensing position of FIG. 3. This tilts spout 40 down toward the divot hole, allowing repair mix M to flow by gravity out through the spout to fill the divot hole. When the divot hole has been sufficiently filled, spout 40 is raised again by tilting cart 10 back onto the front wheel to shut off the flow of repair mix. Filled divot hole 40 can then be tamped down or smoothed with a foot or roller to complete the repair, if needed.

When moving cart 10 long distances, or over rough ground, or up steep hills, some repair mix might tend to bounce or flow out of the spout 40 in the divot alignment position. In the illustrated example, spout 40 can be raised with control cable 60 to the transport position of FIG. 3 to reduce or eliminate this possibility. Control cable 60 is remotely controlled from the handle 20 or another location on an upper part of cart 10 convenient for a standing user. In the illustrated example, cable 60 is a push-pull type cable, and is operated with a control lever 62 mounted on handle 20. Control lever 62 may be provided with a detent-type shift panel 64 or similar locking mechanism to secure spout 40 at different raised positions.

Referring next to FIG. 7, an alternate style of divot repair cart according to the invention is shown generally at 100. Cart 100 has self-supporting wheeled frame 112 with three wheels 114, 116, and 118; a push handle 120; a reservoir and bifurcated feed tube arrangement 130 filled with repair mix via an open top and communicating directly with a dispensing spout 140, and an optional roller assembly 160 spaced rearwardly of the spout and engageable with the ground. Spout 140 is shown in the divot alignment position shown in FIG. 7, with spout 140 substantially horizontal. Repair mix M is accordingly dispensed into a divot hole H by tilting cart 100 rearwardly on rear wheels 116 and 118, thereby tilting spout 140 toward the ground and allowing the repair mix to flow by gravity from reservoir/tubes 130 through spout 140.

The optional roller assembly 160 is positioned rearwardly of spout 140, connected to the spout assembly and in contact with the ground when the cart is upright on all three wheels. After the repair mix has been dispensed into the divot hole and the cart returned to the upright position on all three wheels, the roller can be passed back and forth over the filled divot hole to smooth and level the repair. In order to accommodate the tilting of the cart to dispense mix from spout 140, roller 160 may be mounted on yielding or pivoting members 162, such as flexible rods or rods connected to the frame or reservoir body with pivots or spring members.

Spout 140 (and any attached roller 160) can be raised relative to the cart to a transport position, shown in phantom in FIG. 7 and solid lines in FIG. 8, by rotating the spout (and any attached roller assembly) upwardly via tubular joint 142. Joint 142 is rotatably mounted at each end in the lower ends of the bifurcated reservoir tubes 130, with suitable friction to keep spout 140 raised until intentionally rotated back down into the divot alignment/dispense-ready position, or held in place with means such as a cable or chain C attached to an upper part of the cart.

The materials used to construct cart 10 may vary, but combinations of metal and plastic are preferred. The reservoir 130 of the cart 110 in FIG. 7 can be made, for example, from known types of plastic and plastic tubing.

Cart 10 and cart 110 are both sized and shaped to fit into or onto the portion of a golf cart that normally carries golf bags. This reduces or eliminates the need to use special maintenance equipment or vehicles to transport the cart longer distances over the golf course. The carts may also be towed behind a golf cart or similar vehicle when their spouts are placed in the transport position.

Description of Operation

In operation, the cart 10 is used by filling reservoir 30 with repair mix, and transporting the cart to a divot repair location (for example, the apron of fairway within short iron shots of the green), with the dispensing spout 40 in its "up", transport position. The dispensing spout 40 is then lowered to its divot alignment position, adjacent the ground and ready to dispense. Cart 10 is wheeled into position via handle 20 to visually align spout 40 with a divot hole. Once aligned, the user tilts cart 10 in order to lower spout 40 to its dispensing position, tilting it down and moving the cart back and forth until a sufficient amount of repair mix flows into the divot hole. Cart 10 is then tilted back up onto all three wheels to return the spout to the non-dispensing divot alignment position, and the process is repeated for the next divot hole.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A divot repair cart for repairing divot holes with a flowable repair mixture, comprising:
    a self-supporting wheeled frame that maintains the cart in an upright position relative to the ground whether at rest or in motion, the frame including a manual push handle at standing height at a rear of the cart;
    a repair mix reservoir at a first height above the ground, and a rear-facing dispensing spout having a substantially horizontal divot alignment position approximately parallel to the ground when the cart is in the upright position and at a second lower height adjacent the ground in which the spout is visible from a pushing position at standing height adjacent the handle; wherein,
    the dispensing spout is in open communication with the reservoir, and wherein the cart is operable to selectively cause a repair mixture to flow from the reservoir through the spout into a divot hole; and, wherein,
    the cart is operable to cause the repair mixture to flow from the reservoir through the spout by tilting the cart rearwardly to move the spout from the divot alignment position to a dispensing position in which the spout remains in fixed position relative to the cart and is tilted downwardly.

2. The divot repair cart of claim 1, wherein the spout is movable relative to the cart from the divot alignment position to a transport position in which the spout is raised from the substantially horizontal divot alignment position without tilting the cart.

3. The divot repair cart of claim 2, further including a remote control operable from a standing position adjacent the push handle to move the spout from the divot alignment position to the transport position without tilting the cart.

4. The divot repair cart of claim 3, wherein the remote control comprises a cable operable from the push handle.

5. The divot repair cart of claim 2, wherein the repair mix reservoir is in communication with the spout via a substantially fixed feed tube, and wherein the spout is movably connected to the feed tube.

6. A divot repair cart for repairing divot holes with a flowable repair mixture, comprising:
    a self-supporting wheeled frame including a manual push handle at standing height at a rear of the cart;
    a repair mix reservoir at a first height above the ground, and a rear-facing dispensing spout having a substantially horizontal divot alignment position at a second lower height adjacent the ground in which the spout is visible from a pushing position at standing height adjacent the handle; wherein,
    the dispensing spout is in at least selective communication with the reservoir, wherein the cart is operable to selectively cause a repair mixture to flow from the reservoir through the spout into a divot hole, wherein the spout is movable relative to the cart from the divot alignment position to a transport position in which the spout is raised from the divot alignment position without tilting the cart, wherein the repair mix reservoir is in communication with the spout via a substantially fixed feed tube and the spout is movably connected to the feed tube, wherein the feed tube is substantially rigid, and wherein the spout is connected to the feed tube with a flexible boot.

7. The divot repair cart of claim 1, further including a valve means on the cart selectively operable to start and stop the flow of repair mix through the spout.

8. The divot repair cart of claim 1, wherein the cart further comprises a ground-engaging roller spaced rearwardly from and aligned with the spout.

9. The divot repair cart of claim 8, wherein the roller is normally is contact with the ground when the cart is upright, and further wherein the roller is mounted to yield relative to the cart when the cart is tilted.

* * * * *